Figure 1:
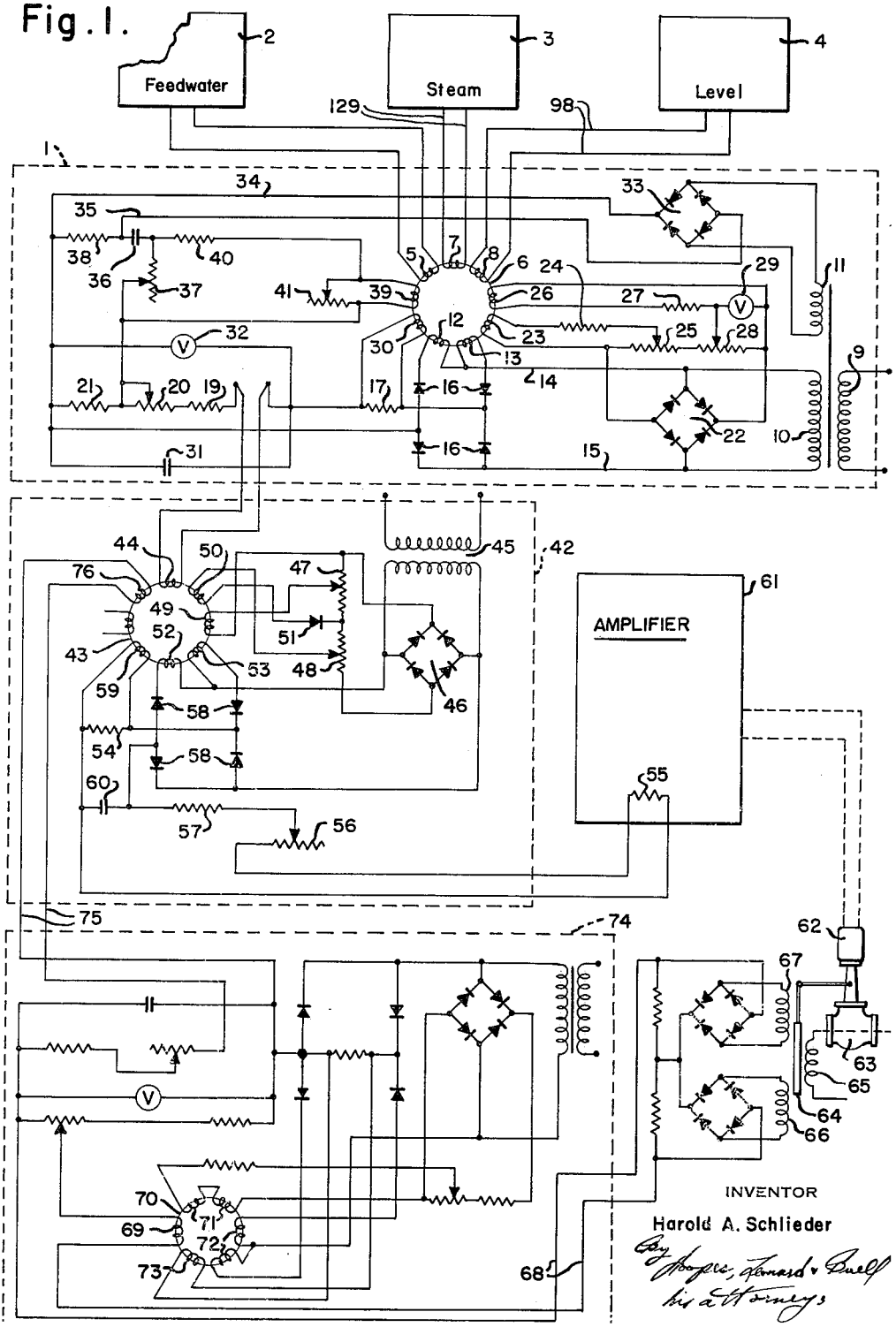

Nov. 9, 1965 H. A. SCHLIEDER 3,216,402
CONTROL MEANS
Filed Sept. 28, 1960 2 Sheets-Sheet 2

INVENTOR
Harold A. Schlieder

– – –

3,216,402
CONTROL MEANS
Harold A. Schlieder, Syracuse, N.Y., assignor to Blaw-Knox Company, Pittsburgh, Pa., a corporation of Delaware
Filed Sept. 28, 1960, Ser. No. 59,108
2 Claims. (Cl. 122—451)

This invention relates to electrical control means for regulating a measured quantity. It is particularly useful for controlling output, flow, and the like, proportional to a demand signal and for modifying the rate of flow of a controlled variable when a proper correction is not made by the ordinary signal. The invention has great utility in controlling feed water flow to steam boilers and is particularly useful in controlling marine boilers.

In the operation of many devices, such as boilers, it is necessary to employ some form of control apparatus which will control a particular setting as a function of one or more variable quantities. In the case of a boiler, for example, it is ordinarily desired to maintain the water level within the boiler, which may be known as the control point, constant. In one simple form of control apparatus, the supply of feed water to the boiler is controlled by a float within the boiler. When the water level or control point is at the desired point, then the feed water valve will be closed. As the control point drops due to a load on the boiler, the valve will open proportionally to the drop in water level. The result is, however, that the control point is necessarily below the desired level under any load condition. This inherent change in the control point in the operation of a simple proportional control apparatus is often known as "droop." In order to compensate for the inherent droop in a simple proportional control, means may be provided to reset the control point whereby it will be returned to its initial or desired level despite the droop inherent in the controller. In other words the reset means offsets the droop and returns the control point to its desired condition or set point.

I provide means to measure at least one quantity and to produce a corresponding signal, amplifier means, quantity supply means operated thereby and generally proportioning the supply of said quantity to the measured quantity. I further preferably provide feedback means from the supply means for modifying the input thereto in accordance with the operating condition of said supply means. I further provide amplifier feedback means and means to vary said feedback over a finite period of time whereby the amplifier output and operating condition of the supply means is further modified. I prefer to employ the invention in connection with steam boilers. I preferably provide boiler feed water control means having means to measure flow of feed water into the boiler, to measure the water level in the boiler, to measure steam flow from the boiler, and to generate electrical signals proportioned to said measurements. I provide means to combine and amplify said signals and to control the feed water valve means in accordance therewith. I further preferably provide means to measure the boiler attitude or orientation and the condition of steam which it is delivering and to vary the resultant amplified signal in accordance with all said measurements. I further preferably provide control point reset means comprising amplifier feedback means and associated means for modifying said feedback and the output of the amplifier over a finite period of time subsequent to a change in the output of the amplifier. I further prefer to provide electrolytic condenser means in the feedback circuit means and means to continuously apply a charging potential to the condenser means, whereby the feed water control means is opened proportionally to the resultant signal determined from the boiler operating conditions and the control point is reset during a finite period of time after the adjustment thereof.

Other details, objects and advantages of my invention will become apparent as the following description of a present preferred embodiment thereof proceeds.

Figure 2:
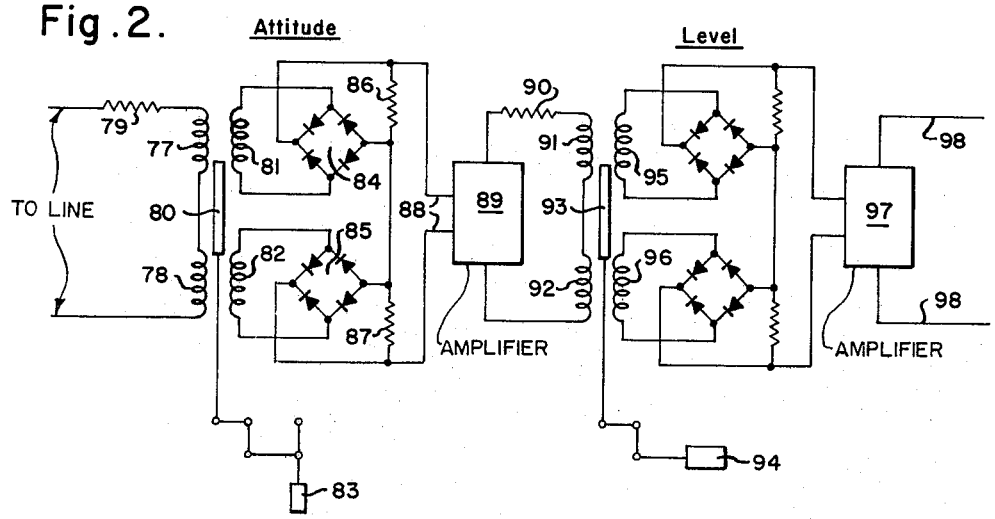
Figure 3:
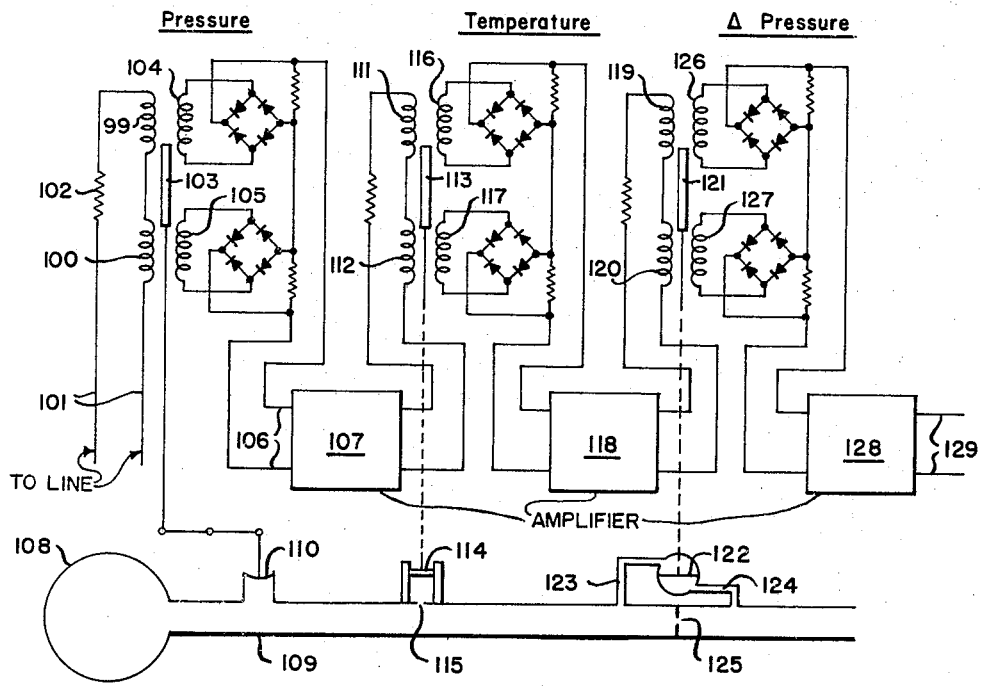

In the accompanying drawings, I have illustrated a present preferred embodiment of my invention in which:
FIGURE 1 is a schematic drawing of a control circuit embodying my invention;
FIGURE 2 is a schematic drawing of boiler level signal generating means suitable for use in the circuit of FIGURE 1; and
FIGURE 3 is a schematic drawing of steam flow signal generating means suitable for use in the circuit shown in FIGURE 1.

FIGURE 1 illustrates in diagrammatic form boiler control means for a marine boiler. FIGURE 1 includes an amplifier generally indicated at 1. Signals are transmitted to the amplifier by feed water flow signal generating means 2, steam flow signal generating means 3, and boiler level signal generating means 4. Feed water flow signal generating means 2 includes means to measure the amount of feed water being supplied. Such means may include an orifice plate in the feed water supply line, means to measure the head loss of water passing through the orifice, and means to produce an electrical signal proportioned to the square root of the head and, accordingly, proportioned directly to the flow through the orifice. Such means are not part of the instant invention and need not be further described here. Suitable means are described in my co-pending application Serial No. 787,065, filed January 15, 1959, now Patent No. 3,078,713. The steam flow signal generating means and the boiler water level signal generating means are described in further detail below.

The signal produced by feed water flow signal generating means 2 is transmitted to a feed water control coil 5 wound upon a pair of magnetic amplifier cores indicated at 6. In like manner, the steam flow and boiler level signal generating means transmit signals to steam flow control coil 7 and level control coil 8, respectively, wound on two stacked cores 6. A power transformer is provided having a primary winding 9 and secondary windings 10 and 11. Magnetic amplifier load coils 12 and 13 are connected to one side of secondary winding 10 by wire 14 and, to the other side by wire 15. One load coil is wound upon each of the cores 6. The cores are then stacked, and the remaining windings are wound upon the stacked cores. A load coil circuit is completed through rectifiers 16, resistors 17, 19, 20 and 21, and control coil 44. The two load coils 12 and 13 are alternately energized, one being energized during each half of a cycle. Rectifiers 16 provide an unidirectional current through the resistors. A full-wave rectifier 32 is connected across secondary winding 10. A magnetic amplifier bias coil 23 is wound upon core 6 and is connected across the output of rectifier 22 through resistor 24 and a variable tap on resistor 25. A set point coil 26 is wound upon cores 6 and is connected across the output of rectifier 22 through resistor 27 and a variable tap on resistor 28. A voltmeter 29 is connected across the circuit of set point coil 26 and resistor 27. Coil 26 is, in fact, a second bias coil. It is, however, for running adjustments, and resistor 28 is, accordingly, placed at a convenient point on the boiler control panel so that it can be adjusted by the operator from time to time as is desirable.

A positive feedback coil 30 is wound upon cores 6. Resistor 17 serves as a shunt for feedback coil 30. Thus, the power supplied by secondary winding 10 of the power transformer passes through one of load coils 12 and 13 and through the circuit comprising resistor 17 and feedback coil 30 in parallel, magnetic amplifier control coil 44, and resistors 19, 20 and 21. A matching condenser 31 may be coupled across resistors 19, 20 and 21, and control coil 44. A voltmeter 32 may be connected between the same points. A full wave rectifier 33 is connected to secondary winding 11 of the power transformer and supplies a full-wave direct current to wires 34 and 35. Wire 35 is connected to one side of a large condenser 36. I preferably use an electrolytic condenser of perhaps 4,000 microfarads. An ordinary foil type condenser of this capacity is of impractical size, and it is necessary therefore, to use an electrolytic condenser to maintain a reasonable size limitation. Wire 34 is connected to the other side of condenser 36 through resistor 21 and variable resistor 37. A resistance 38 is connected across wires 34 and 35. Rectifier 33 thereby maintains a continuous direct current potential upon electrolytic condenser 36, serving to keep the condenser charged and to maintain an effective film within the electrolytic condenser at all times. A negative feedback coil 39 is connected across resistor 37 through resistor 40, and a variable resistor 41 is placed in parallel with feedback coil 39. Thus, there are three parallel circuits to one side of condenser 36: through resistor 37, through resistor 41, and through negative feedback coil 39.

A second amplifier is indicated generally at 42. It preferably comprises a pair of magnetic amplifier cores 43 upon which a control coil 44 is wound. The cores are wound in the same manner described for cores 6. Control coil 44 is part of the load resistance of amplifier 1. A power transformer 45 is provided for amplifier 42 and a rectifier 46 is connected to the output of transformer 45. Two potentiometers 47 and 48 are connected in series across the output of rectifier 46 with potentiometer 48 at the higher potential. Bias coil 49 is wound upon core 43 and connected to one side of the rectifier output and to the movable contact of potentiometer 47. A second bias coil 50 is connected through a semi-conductor 51 to the midpoint between potentiometers 47 and 48, and to movable contact of potentiometer 48. Bias coil 50 is negatively wound to oppose the bias supplied by coil 49. Semi-conductor 51 does not become conductive in a reverse direction until the Zener voltage of the semi-conductor is exceeded. Therefore, at low applied voltages there is no current flowing in coil 50 because semi-conductor 51 prevents such current flow. As the applied voltage increases, a current begins to flow in bias coil 50 tending to desaturate the amplifier and offsetting the increased bias due to the increased voltage across bias coil 49. In this manner, a substantially constant output is maintained independent of variations in the supply voltage. A more detailed description of such a voltage compensating device is set forth in my co-pending application, Serial No. 788,142, filed January 21, 1959, now abandoned.

Load coils 52 and 53 are connected to the secondary winding of transformer 45 through a feedback resistor 54, an external load resistance 55, variable resistor 56, resistor 57 and rectifiers 58, in a conventional manner. Amplifier feedback coil 59 is wound upon magnetic amplifier core 43 and is connected in parallel with feedback resistor 54. A condenser 60 is connected across resistors 55, 56 and 57.

A valve control amplifier is indicated at 61. It is of conventional type and need not be described in detail. The load resistance 55 associated with amplifier 42 comprises the control coil of valve control amplifier 61 and causes it to operate a valve control motor 62 to open and close feed water valve 63 in accordance with the amplified signal delivered by amplifier 42 to load resistance 55. Valve 63 controls the flow of feed water into the boiler.

The core 64 of a differential transformer is connected to the stem of valve 63 and is moved by changes in the opening of the valve. The transformer has a primary winding 65 to which power is supplied and secondary windings 66 and 67. Movement of core 64 changes the relative outputs of secondary windings 66 and 67. The outputs of the secondary windings are rectified and opposed to produce a varying signal on wires 68 which deliver the signal to control coil 69 wound upon a pair of magnetic amplifier cores 70 in the manner described above. Bias coil 71 and load coils 72 are provided in the same manner therefore described. An amplifier feedback coil 73 is also provided. The amplifier is generally indicated at 74. Its general arrangement is similar to those previously described and its operation will be readily apparent to those skilled in the art without further detailed description. The output of the amplifier is delivered on wires 75 to a valve position feedback coil 76 wound on magnetic amplifier cores 43 of amplifier 42.

FIGURE 2 diagrammatically illustrates the boiler level signal generating means 4 indicated in FIGURE 1. It comprises attitude and level sensing and signal means which are generally indicated by legends. A differential transformer having a pair of primary windings 77 and 78 is connected to a power source through resistor 79. A movable core member 80 is placed between windings 77 and 78 and transformer secondary windings 81 and 82. A pendulum 83 is mounted adjacent the boiler and connected to core 80 through a conventional type of crank and lever linkage. Changes in the position of the boiler, as by rolling of a ship in which the boiler is mounted, change the position of the pendulum relative to the boiler. These changes are transmitted to core 80 by the linkage and cause corresponding changes in its position and changes in the voltage induced in secondary windings 81 and 82. The outputs of secondary coils 81 and 82 are rectified by rectifiers 84 and 85, respectively. An external loop for each rectifier is provided through resistors 86 and 87, respectively. The rectified outputs from the two secondary windings are opposed and the resultant signal is delivered by wires 88 to an amplifier 89 which accepts a D.C. input and produces a pure sine wave A.C. output proportioned to the input. Amplifier 89 is preferably a magnetic amplifier.

Amplifier 89 delivers a proportional amplified signal through resistor 90 to primary windings 91 and 92 of a differential transformer having a movable core 93. Core 93 is connected through a conventional mechanical linkage to a float 94 placed within the boiler drum. Changes in the water level in the drum cause changes in the level of float 94 which are transmitted to core 93 through a conventional connecting linkage and cause corresponding movement of core 93. The transformer secondary windings 95 and 96 are connected to rectifiers and their outputs are rectified and opposed and the resultant signal delivered to an amplifier 97 of the same type as amplifier 89. The input to amplifier 97 is amplified and delivered to wires 98 which transmit the signal to water level control coil 8 (FIGURE 1).

FIGURE 3 illustrates the steam flow signal generating means indicated generally at 3 in FIGURE 1. It comprises pressure, temperature, and pressure differential sensing and signal means which are generally indicated by legends. Power is supplied to primary windings 99 and 100 of a differential transformer through wires 101 and resistor 102. A movable core 103 is positioned in the differential transformer. The outputs of the transformer secondary coils 104 and 105 are rectified and opposed in the same manner as previously described, and the resultant signal is delivered by wires 106 to amplifier 107 of the type described above. A boiler drum is indicated diagrammatically at 108 and the steam line extends at 109. A flexible diaphragm 110 is positioned in the steam line and one end of a linkage is connected thereto. The other end of the linkage is connected to core 103. When the pressure varies in the steam line, there is a movement or flexing of diaphragm 110 and a corresponding movement of core 103.

The output of amplifier 107 is delivered to the primary windings 111 and 112 of a differential transformer having a movable core 113. Core 113 is connected through a suitable linkage to a temperature measuring device indicated by a piston 114 mounted in a well 115 which is exposed to the steam. The steam causes expansion and contraction of the fluid in the well proportioned to the steam temperature and results in a movement of core 113 with changes in the steam temperature. The outputs of differential transformer secondary windings 111 and 112 are rectified, opposed and delivered to amplifier 118 in the same manner previously described. The output of magnetic amplifier 118 is delivered to the primary windings 119 and 120 of a differential transformer having a movable core 121. Core 121 is connected through a suitable linkage to a flexible diaphragm 122 in an enclosed chamber having opposite sides connected by pipes 123 and 124 to opposite sides of an orifice plate 125. The outputs of the differential transformer primary windings 126 and 127 are rectified and opposed and the resultant signal delivered to an amplifier 128 of the type previously described. The output is delivered by wires 129 to steam flow control coil 7 (FIGURE 1).

Each of the differential transformers produces a voltage in each of the secondary windings which varies with the position of the movable core. Movement of the core in one direction increases the induced voltage in one of the windings and simultaneously decreases the induced voltage in the other winding, movement of the core in the opposite direction causing the opposite result. The outputs of the two secondary windings, when combined and opposed, give a signal whose magnitude and polarity is indicative of the core position and the input to the differential transformer.

When the boiler to be controlled by the apparatus shown in the drawings is operating, steam is drawn from boiler drum 108 through steam line 109. This causes a pressure drop across orifice 125 and a resulting bending of diaphragm 122 because of the differential in pressures on opposite sides of orifice 125. Movement of diaphragm 122 in turn moves core 121 in the differential transformer. The actual weight of superheated steam flowing through orifice 125 for a given pressure drop will vary with the temperature and pressure of the steam. When the pressure of the steam increases, the weight of steam for a given pressure drop also increases. Therefore, diaphragm 110 shifts core 103 to increase the resultant signal produced by secondary windings 104 and 105 with increases in steam pressure. Increases in steam pressure will, therefore, increase the signal generated by amplifier 107, and decreases in steam pressure will decrease that signal. The output of amplifier 107 is the input of coils 111 and 112, and variation in the output of amplifier 107 will, accordingly, affect the output of the subsequent differential transformers.

Increasing steam temperatures decrease its density and thereby decrease the weight flowing through orifice 125 for a given head loss. Accordingly, when the fluid in temperature well 115 expands with increases in temperature, it shifts core 113 to reduce the resultant signal from secondary windings 116 and 117 and the output of amplifier 118. The output of amplifier 118 is, of course, the primary current in windings 119 and 120. The signals generated in secondary windings 126 and 127 are combined and the resultant signal is amplified by amplifier 128 for transmission to steam flow control coil 7. Thus, the signal delivered to amplifier 128 reflects the pressure, temperature, and pressure drop in the flowing steam. For reasons previously stated, amplifier 128 preferably includes means to generate an electric signal which is the square root of the resultant signal from coils 126 and 127 and is directly proportional to the flow in steam line 109.

The signal produced at control coil 7 is primarily generated according to the position of core 121 which will cause the outputs of secondary windings 126 and 127 to be equal and opposite when there is no head loss across orifice 125. The output to the temperature differential transformer is likewise modified by the temperature of the steam passing through the steam line, and the input to that transformer is modified by the pressure differential transformer. Thus, the signal at control coil 7 will accurately reflect the actual weight of steam flowing from the boiler. It will be apparent to those skilled in the art that if saturated steam is employed, it is unnecessary to measure the temperature. Means may be substituted, however, to measure the quality of the steam rather than its temperature.

When feedwater is being supplied to the boiler, a signal is transmitted to control coil 5 which is proportioned to the amount of feedwater being supplied to the boiler as described above. The winding of control coil 5 is such that the signal imposed thereon opposes the signal at steam flow control coil 7.

When the water level in the boiler drum drops, float 94 falls with the water level and shifts core 93 causing a change in the outputs of secondary windings 95 and 96. The resultant signal is amplified by amplifier 97. As the water level drops, due to a load on the boiler, a signal is imposed upon water level control coil 8 which is cumulative to the signal imposed upon steam flow control coil 7 by steam flow and opposed to the signal imposed upon control coil 5 by feedwater flow. When the position for attitude of the boiler is changed, by rolling of the ship in which the boiler is positioned, the water in the boiler will run to the low side of the boiler. This will result in raising or lowering of the float 94 depending upon its position in the boiler drum. Rolls of the ship to the other side will produce an opposite result. Pendulum 83 is mounted to maintain a vertical position regardless of rolls of the ship. When the ship rolls, movement of pendulum 83 will cause a movement of core 80, a change in the output of secondary windings 81 and 82, and a corresponding change on the signal delivered to amplifier 89 on wires 88. That signal is amplified and delivered to primary windings 91 and 92. Windings 81 and 82 are arranged to deliver an increasing signal when movement of the ship reduces the signal on windings 95 and 96 and vice versa. The result is that for a given water level the two inputs maintain a substantially constant resultant signal delivered by amplifier 97 on wires 98. The output is independent of the boiler attitude and varies only with real changes in the water level in the boiler drum.

When amplifier 1 is arranged in operating condition and input signals are being deliverd to control coils 5, 7 and 8 as by flow of steam in steam line 109 and a drop in the water level, an output is produced at load coils 12 and 13 and across control coil 44 of amplifier 42. A feedback is produced at feedback coil 30 which makes the amplifier have an infinite gain. However, the amplifier output is restrained by the negative feedback in coil 39. Thus, amplifier 1 produces a signal which is responsive to the signals produced by the signal generating assemblies 2, 3 and 4. The output of amplifier 1 is imposed upon control coil 44 which is in turn amplified by magnetic amplifier 42 and delivered to valve control amplifier 61 which operates motor 62 to open valve 63 to supply feed water to the boiler. The valve position is indicated by the position of core 64 which is moved by operation of the valve. Movement of core 64 changes the output signals of secondary windings 66 and 67 and produces a signal which is amplified by amplifier 74 and transmitted by wires 75 to valve feedback coil 76. When valve 63 opens, the resulting feed water flow will produce a signal on control coil 5 opposing the signals on coils 7 and 8 tending to reduce the signal on control coil 44. As feed water valve 63 is opened, a signal is generated on valve position feedback coil 76 of amplifier 42 opposing the signal on control coil 44 and reducing the output of amplifier 42 until the valve position reaches the proper point for the input signal on control coil 44. It is, of course, necessary that there be an unbalance in the boiler operating conditions before amplifier 1 will produce a signal which results in opening feed water valve 63 to offset the drain of steam from the boiler. If the load on the boiler increases further, an additional drop in the water level occurs before valve 63 opens to supply feed water to make up the outflow of steam. Further unbalances are necessary before valve 63 is opened further to provide addtional feed water. The result is that makeup of water in the boiler necessarily droops or lags behind use of steam.

The foregoing, however, ignores the effect of condenser 36 which modifies the operation of the system. When amplifier 1 is operating at any fixed output, there will be a voltage drop across resistor 21. Should the output of amplifier 1 increase, due to an increase in the boiler load, there will be a greater voltage drop across resistor 21 and concurrently across the parallel circuit comprising resistors 38 and 40, condenser 36 and feedback coil 39. The increased voltage will result in a current flowing through feedback coil 39 to charge condenser 36. This current opposes the output of the amplifier and consequently restricts the opening of valve 63. There is also, of course, an increased current in feedback coil 30. As condenser 36 becomes charged the charging current will decrease until the condenser is fully charged for the voltage across resistor 21. Therefore, a decreasing current will flow through feedback coil 39, and this will in turn cause an increase in output of amplifier 1. The increased output will cause valve 63 to be opened further, thereby supplying a greater quantity of feedwater to the boiler. This will tend to reset the control point to its set point. As the water level rises to its set point, the signal from the level signal means will decrease, changing the amplifier output and tending to close valve 63.

The initial response of amplifier 1 to a sudden change in input is controlled by the setting of potentiometer 41 which can be varied to shunt a variable part of the feedback current around feedback coil 39, thereby modifying the effect of the feedback on the amplifier. The reset rate is determined by the rate at which condenser 36 is charged. This is controlled by adjustment of potentiometer 37. Resistor 40 has a relatively high resistance so that the inrush current through the feedback coil circuit is very little affected by potentiometer 37.

The zero point or bias of amplifier 1 can be adjusted by appropriate adjustment of bias of the coil 26 through adjustment of the contact on potentiometer 28.

Following an increase in demand, amplifier 1 will cause feedwater valve 63 to open. The flow of feedwater then produces a signal reducing the output of amplifier 1 to zero and stops further opening of valve 63. At this point the flow of feedwater offsets the steam flow, but the boiler water level will be low. Thus, the response of valve 63 lags behind the water level. As condenser 36 charges, however, the negative feedback, due to coil 39, will concurrently decrease and the output of amplifier 1 will gradually increase, causing opening of feedwater valve 63. This will result in refilling the boiler by adding feedwater faster than steam is withdrawn. Thus, the overall effect is to open valve 63 proportionally to demand on the boiler and then to alter the output of amplifier 1 to obtain further feedwater flow and reset the water level to design operating conditions for the set point.

If the boiler output is reduced and the steam flow signal is also reduced, there will be a proportional decrease in the output of amplifier 1. This will result in a closing of feedwater valve 63 until the inputs to amplifier 1 again balance. Condenser 36, however, will discharge a gradually decreasing current which will tend to increase the amplifier output until it is discharged, thereby preventing underfilling of the boiler when the load is first reduced.

Condenser 36 is an electrolytic condenser to maintain its size within reasonable limits for the desired capacity. The condenser is large enough to charge over a period of three to four minutes, if necessary, to match the response of the system to the boiler. Condenser 36 has an internal film which must be maintained at a voltage level or brought to such a level to maintain the film intact. If the film is lost there will be considerable leakage until it is restored. A rectified D.C. voltage is applied across condenser 36 by retcifier 33. It is, of course, a fluctuating voltage and has sufficient peak value to maintain the desired condenser condition, regardless of the amplifier operation. If the film in condenser 36 were lost, the feedback current through coil 39 would be so great as to prevent the amplifier from reaching full output and, accordingly, from reestablishing the film in condenser 36.

As appears from the above description, the operation is broadly one in which the steam flow is measured and the feedwater valve position is made dependent upon such measurements. The steam flow measurment is, however, modified by the feedwater flow and the boiler water level. It is further modified in that the output of amplifier 1 is broadly proportional to the signals it receives, but that the output is altered subsequent to a change in amplifier output in an effort to maintain the boiler under equilibrium conditions at all operational loads and under all variations in load.

Although I have illustrated and described a present preferred embodiment of my invention, it will be apparent the invention may be employed using only some of the sensing and signal generating means, or that additional sensing and signal generating means may be employed in connection with other quantities which it is desired to measure. The invention may likewise be employed for other types of apparatus where sensing and control is required. It is to be understood that my invention may be variously practiced within the scope of the following claims.

I claim:

1. Means to regulate the supply of feedwater to a boiler comprising feedwater supply means, means to measure the flow of feedwater to the boiler and generate a corresponding electrical signal, boiler water level measuring means generating an electrical signal corresponding to said level, boiler attitude measuring means effective to vary the boiler water level signal in accordance with changes in the boiler attitude, steam flow measuring means generating an electrical signal corresponding to the steam flow, steam condition sensing means to determine the condition of the steam and vary the steam flow signal with changes in the steam condition, amplifying means to receive and combine said signals into an amplified resultant signal proportional to the algebraic sum of the input signals, feedback means for the amplifying means arranged to oppose change in output of the amplifier, and capacitor means in the feedback means whereby following a change in output of the amplifying means the feedback means will oppose change of the amplifying means output until the capacitor means reach a capacity level corresponding to the changed output and the feedback means becomes ineffective, feedwater valve means to regulate flow of water in the feedwater supply means, and means in operative connection with said amplifying means and said feedwater valve means to operate said valve means responsive to the resultant signal.

2. In a boiler having variations in water level, feedwater flow to the boiler, and steam flow from the boiler, said boiler having feedwater valve means associated therewith, the improvement in control means comprising means to measure a plurality of said variables and generate separate electrical signals proportioned thereto, means to measure changes in the state of at least one of said measured variables and adjust the corresponding electrical signal in accordance with changes in the state of said variables, amplifier means receiving and combining all of said signals and producing an amplified resultant signal proportioned to the sum of the input signals, means in operative connection with said amplifier and said feedwater valve means and effective to open said feedwater valve means proportionally to said resultant signal, amplifier feedback means opposing an increase in amplifier output, capacitor means in series circuit arrangement with said feedback means whereby a change in output of the amplifier causes a current to flow in the feedback means for a period following a change in output of the amplifier, and separate capacitor charging means.

References Cited by the Examiner

UNITED STATES PATENTS

| | | | |
|---|---|---|---|
| 1,674,456 | 6/28 | Smoot | 122—451 |
| 1,962,676 | 6/34 | Albright | 122—451 X |
| 1,975,086 | 10/34 | Dickey | 122—451 X |
| 2,098,913 | 11/37 | Dickey | 122—451 |
| 2,250,341 | 7/41 | Wunsch | 122—451 X |
| 2,703,679 | 3/55 | Shank | 236—9 |
| 2,904,018 | 9/59 | Karassik | 122—451 |
| 2,910,643 | 10/59 | Patton | 323—89 |
| 2,926,300 | 2/60 | Mamon | 323—89 |
| 3,042,007 | 7/62 | Chien et al. | 122—448 |

FOREIGN PATENTS 658,192 10/51 Great Britain.

OTHER REFERENCES

Combustion Engineering (Lorenzi), published by Combustion Engineering, Inc. (New York), 1957, pages 27–36 to 27–40.

PERCY L. PATRICK, *Primary Examiner.*

FREDERICK KETTERER, FREDERICK L. MATTESON, Jr., *Examiners.*